Patented Dec. 27, 1938

2,141,313

UNITED STATES PATENT OFFICE 2,141,313

WATERPROOF STARCH-BASE ADHESIVE

George H. Osgood and Russell G. Peterson, Tacoma, Wash.; said Peterson assignor to said Osgood No Drawing. Application November 26, 1934, Serial No. 754,834

2 Claims. (Cl. 134—23.3)

In the manufacture of veneer panels, it is frequently desirable to hot-press such panels after the plies thereof are smeared with adhesive, for the purpose of making the product strongly adherent and water-resistant.

The adhesive most commonly used for this purpose comprises a blood-albumen base, and synthetic resin adhesives have been demonstrated somewhat in the past two years. Both of these types of adhesives are much more expensive than vegetable-seed-residue glues which are now being used largely for making strong, highly water-resistant panels, the comparative cost of making panels with the blood-albumen base adhesives and the synthetic resin adhesives running anywhere from five to eleven times the cost of making a panel with a vegetable-seed-residue glue. The vegetable-seed-residue glues, however, do not, when hot-pressed, result in a panel having as great adhesion and water-resisting qualities as when blood-albumen or synthetic resin adhesives are used.

The main object of this invention is to provide a glue which will have glue characteristics comparable to those of the blood-albumen and synthetic resin adhesives, but at a cost comparable to that of the vegetable-seed-residue glue; and other objects of the invention will become apparent on reading this specification.

We have discovered that such a glue may be made from starch, such as potato starch, cassava starch, corn starch, and, in fact, from any kind of starch or material containing starch when in the form of a fine flour, as well as from manioc meal and other vegetable sources of starch when the fibrous material naturally accompanying the starch is ground up along with the starch itself.

One of the features of this invention resides in using the starch in unconverted form, applying it to the wood sheets and thereafter hot-pressing them, the starch being in such a form that it may be applied mechanically to the wood sheets, one set after another, the amount applied to each set being substantially the same as the amounts applied to the other sets. In other words, the starch mixture is stable so that it may be uniformly applied to all sets.

Another feature of this invention resides in the addition of a water-soluble zinc salt to an unconverted stable starch material.

Another feature of this invention resides in combining an aldehyde with a starch either in the absence or presence of a material such as a water-soluble zinc salt which has a modifying effect on the adhesive.

Another feature of the invention resides in having present in the starch material ground-up fibrous matter of the natural source of the starch.

Another feature of the invention is to cause a loose combination, for example, a condensation or at least a partial condensation of the aldehyde with some material capable of condensing therewith before adding it to the starchy material.

Starch or starch-containing material, the starch being in unconverted form, can be applied to sheets of wood which may thereafter be hot-pressed in the presence of moisture to develop strong adhesion between the plies to form a veneer panel, but such a process has heretofore been commercially impractical for the reason that when the starch or starch material is mixed with water, it can not be fed mechanically from a large tank to means for applying it to the wood plies, due to the fact that the starchy material settles in the water in which it is contained and it can not, therefore, be spread uniformly on plies of wood by any type of mechanical spreader. This separation is accentuated when applying rolls are used due to the centrifugal tendency of the rolls to increase the separation. We have found that we can avoid such difficulty by using a stable starch mass; that is, one that may be made stable by the presence of a very small amount of added material or it may contain no added material whatsoever, as hereinafter explained.

We have discovered that dry powdered unconverted starch or starch-containing material, as above described, may be spread or sprinkled on the wood plies which may be thereafter hot-pressed to develop adhesion, the moisture naturally present in the wood, or added moisture, aiding in the conversion of the starch at the proper moment.

We have also discovered that a mixture of unconverted starch or material containing unconverted starch, with water may be stabilized to prevent stratification or settling by the addition thereto of a small amount of animal glue, fish glue, casein glue, concentrated sulphite liquor, converted starch, or other colloid. We prefer to use as the colloid one which does not affect the hydrogen ion concentration in such a manner as to bring it over to the alkaline side. Another way of stabilizing unconverted starch in water is to soak unconverted starch in about an equal weight of commercial formaldehyde solution (40% in water). This forms a thick paste after standing for several hours at room temperature and may be used in lieu of the above mentioned substances as the stabilizing agent.

Starch, whether applied dry or wet, will increase very much in volume during the process of conversion if sufficient moisture be present to convert it, the increase being in the nature of somewhere around twenty, thirty, or forty times its original volume. When starch thus expands or swells at the glue line of an incompleted panel, it is forced up into the pores of the wood which open into the glue line, as the result of which the binding effect of the glue is substantially increased.

A material may be added to the starch to retain a certain amount of moisture after the water has dried off; such, for example, as sugar, calcium chloride, or other hygroscopic material. If it is desired to mix the starch or starch-containing material with water, it may be done in the proportion of one part by weight of starch to one and one-quarter parts by weight of water. The starch powder may be stirred up with the water and then applied. To stabilize the mixture of starch and water, a small amount of a colloid is added so that the starch will be suspended in the colloidal solution. Two to five per cent. of the colloid is generally sufficient, a criterion, however, being a sufficient amount of the particular colloid used to form a water-starch mixture which is sufficiently stable for the purpose of mechanical application to wood plies on an industrial scale. We may, for example, mix from two to five parts by weight of the starch or starch-containing material with one hundred twenty-five parts by weight of water and boil or heat at a temperature of at least 200° F. until the starch is converted to a viscous, heavy, stringy mass, whereupon ninety-eight to ninety-five parts of unconverted starch (or material containing starch) are added thereto after cooling, whereupon the mixture will be quite stable.

The proportion of one part of starch to one and one-quarter parts of water by weight is variable and is given as an example and for the purpose of commercial use of our invention. Starch and starch-containing ground-up natural material are considered as equivalents so that the proportions, say, of manioc meal used may likewise be one part of manioc meal to one and one-quarter parts of water. Manioc meal is cheaper than tapioca or sago or other purified cassava starch; and as a general rule starch material containing unseparated fibrous material is cheaper than starch separated therefrom. Furthermore, the starch-containing material with the natural fiber in it is generally very much more satisfactory as an adhesive than a starch material from which the natural fiber has been separated, or pure starch. For both of these reasons, we prefer to use the unseparated starch together with the natural fibrous material of the plant.

The water-resistance and adhesive strength of starch glues, wherein the starch is applied in an unconverted state, are increased by the addition of water-soluble zinc salts, such as zinc chloride or zinc sulphate, or both together. For each hundred pounds of dry starch or starch-containing material of the type above mentioned, we have found the most effective amounts of these zinc salts to be about fifteen pounds of zinc chloride together with ten pounds of zinc sulphate, these amounts, of course, being variable. The maximum zinc salt effect is attained at about these proportions, and a greater amount of zinc salts does not seem to increase particularly the desired characteristics, while lesser amounts have an effect which decreases with the amount of zinc salts added. The zinc salts are more efficient when used with the whole meal (manioc) than when used with a refined starch.

Our glue material may be applied as pure dry powdered starch or dry powdered natural material containing starch and fiber, or these may be applied moist or they may be applied wet, and any of the foregoing may be applied together with, or without, water-soluble zinc salts.

The water-resistance of the completed panel will be further increased by the presence of an aldehyde or source of aldehyde of such a nature that the aldehyde will not be dissipated or be lost when the heat is first applied in the step of hot-pressing. Various aldehydes may be used, not only formaldehyde but furfural, acetaldehyde and benzaldehyde, as well as others. Many aldehydes may be used, provided they are in condition not to be dissipated, as aforesaid. The supply of aldehyde is preferably present in the presence of the zinc salts but good effects are nevertheless produced when the zinc salts are not present. The aldehyde appears to act as a water-proofing agent when it is held in the glue line long enough to react on the starch during its conversion to an adhesive under heat and pressure in the absence of the zinc salts, but with the aldehyde the addition of the zinc salts has an effect on increasing not only the strength but the water-resistance as well. Furthermore, the aldehyde effect may be obtained with dry, moist or wet, stable or unstable starch-base glues, where the starch base is pure starch or a natural growth containing starch and fiber is ground up to furnish the starch base, such, for example, as manioc meal. The fiber, or possibly the materials contained in or accompanying the fiber, increase the effects of the zinc salts and of the aldehyde so that where, for example, manioc meal is used, only half of the amounts of these reagents will give the same strength and water-resistance as the amount of such reagents used with separated or purified starch. These reagents are the more expensive components of the glue and we, therefore, prefer to use the manioc or other meal from which the starch has not been separated from the fibers.

We have found that urea, thiourea, phenol, cresol and other materials which are condensable with aldehydes may be condensed or partially condensed therewith and then used in our glues as a source of aldehyde, the uncondensed formaldehyde and excess formaldehyde present thus having time to act on the starch so that large amounts of the aldehyde are not dissipated or lost in the hot-pressing step.

We prefer to heat the aldehyde and the material capable of condensation therewith alone and before addition thereof to the starchy material; and we have found that it is best that the heating be slight in order to produce only a slight amount of condensation, preferably not more than one-tenth of the full reaction toward complete condensation.

To obtain this desired partial reaction and hold the product in the condition mentioned for a long duration of time, such as perhaps two or three months, we add to the two materials a catalyst such as hexamethylenetetramine or zinc chloride. We prefer to use zinc chloride as it also acts on the starch to produce the formaldehyde starch condensation product ultimately desired, although we use additional zinc chloride or other soluble zinc salts in the glue, as mentioned above.

We prefer to have present an excess of the aldehyde over the material condensable therewith; for example, the common formaldehyde-urea condensation combination is one part of urea to two to three parts of formaldehyde, but we prefer to have at least three, and preferably more, parts of formaldehyde present, the proportion of formaldehyde preferred being generally from three-and-a-half to five times the amount of urea. Much poorer results are obtained when the proportion of formaldehyde to urea is as low as two-and-a-half, or less, to one.

We prefer to prepare the glue in the plywood plant by adding to one part (by weight) of the dry starchy powder about one-and-one-quarter parts of water, adding the water-soluble zinc salts in the proper proportion, and then the aldehyde condensation mass prepared as above described is added in the desired proportion and the whole stirred until thoroughly mixed.

For making the condensation product to be added to the starchy material, we may use different materials and different proportions thereof, some specific examples being here given wherein the parts indicated are by weight:

A

| | Parts |
|---|---|
| Urea | 10 |
| Formaldehyde | 40 |
| Zinc chloride | .01 to .1 |

Heat for about 30 minutes.

B

| | Parts |
|---|---|
| Urea | 1 |
| Formaldehyde | 5 |
| Hexamethylenetetramine | .01 to .1 |

Heat about 30 minutes.

C

| | Parts |
|---|---|
| Thiourea | 1 |
| Formaldehyde | 4 |
| Zinc chloride | .01 to .1 |

Heat about 30 minutes.

D

| | Parts |
|---|---|
| Phenol | 1,000 |
| 40% formaldehyde | 1,400 |
| Hydrochloric acid | 10 |

Boil the above for a few minutes and add 10 parts of sodium hydrosulphite.

As already stated, other aldehydes may be used in place of formaldehyde which, however, gives the best results for the least expense; and we prefer to use the urea- or thiourea-formaldehyde combinations because of their cheapness and ease of preparation, which requires only the intermixture of the materials and heating at a nearly boiling temperature for from twenty to thirty minutes, and then permitting it to cool, after which it is put into kegs or drums and shipped to the glue user.

Different specific formulae for the glue are indicated as follows, wherein the parts stated are also by weight:

1

| | Parts |
|---|---|
| Cassava starch | 75 |
| Water | 94 |
| Urea-formaldehyde combination | 25 |
| Zinc chloride | 15 |
| Zinc sulphate | 7½ |

2

| | Parts |
|---|---|
| Potato starch | 75 |
| Water | 95 |
| Furfural-phenol combination | 15 |
| Zinc chloride | 10 |
| Zinc sulphate | 5 |

3

| | Parts |
|---|---|
| Starch | 75 |
| Water | 94 |
| Urea-formaldehyde combination | 5 to 50 |
| Zinc chloride | 4 to 16 |
| Zinc sulphate | 2 to 8 |

4

| | Parts |
|---|---|
| Manioc meal | 75 |
| Water | 100 |
| Thiourea-formaldehyde combination | 10 to 40 |
| Zinc chloride | 8 |
| Zinc sulphate | 3 |

5

| | Parts |
|---|---|
| Manioc meal | 75 |
| Water | 94 |
| Urea-formaldehyde combination | 25 |
| Zinc chloride | 15 |
| Zinc sulphate | 7½ |

6

| | Parts |
|---|---|
| Starch | 75 |
| Water | 110 |
| Phenol-formaldehyde combination | 5 to 60 |
| Zinc chloride | 4 to 16 |
| Zinc sulphate | 2 to 8 |

It is, of course, understood that the various types and sources of starch are interchangeable in the formulae given above, although we generally prefer to use manioc meal as the source of starch.

The amounts of aldehyde combinations may be varied to the proportion necessary to introduce the proper amount of aldehyde to give the desired water-resistance to the adhesive, though we find that about twenty-five parts of the urea-formaldehyde combination to seventy-five parts of starch base is sufficient to produce an adhesive stronger after soaking than any of the present casein or vegetable-seed-residue adhesives that are used in commercial water-resistant panels today, though we have used up to sixty parts of these aldehyde combinations with excellent results.

The glue mixed as we have described is spread on the veneer to be made into panels in amounts of twenty-five to thirty pounds of the base per thousand feet of three-ply panels, and then the panel to which the glue has been applied is placed under pressure and heated to about 250° F. to 500° F.; and after this heat penetrates to the glue line, the starch is swelled or converted to a viscous fluid and, at the same time, formaldehyde is released which reacts with the starch and in the presence of the zinc salts forms an unusually strong and water-resistant glue bond. The swelling of the starch particle under pressure forces the converted starch further into the pores of the wood than is possible where completed glue is spread on the panel and then pressed, and thereby gets a much firmer hold on the wood fibers adjoining the glue line than has been produced heretofore.

Our glue can be applied to the wood surface and the sheets of wood may then be hot-pressed together immediately thereafter, or they may be first stored for a period of time convenient to the manufacturer, even though such period may amount to several months. There is no adhesion until the assembled coated sheets of wood are hot-pressed together. Hot-pressing develops the adhesive properties of the glue, and not only this, but forces the glue into the pores of the wood to develop a very strong interlocking bond therewith.

Our starch glues do not have the desired quality of strong adhesion until after the hot-pressing step, and wood plies treated therewith can be laid away for a considerable period of time, as stated above, and thereafter united into a panel by hot-pressing. The hot-pressing of the plies of wood having our glue thereon is essential to develop the high degree of adhesiveness, for the same glues can be subjected to the same heat and the same pressure in an autoclave and then spread on wood without developing the high degree of adhesion resulting from the application of heat and pressure in the presence of the wood.

The minimum temperature necessary properly to convert the glue between the wood plies runs somewhere around 170° F. to 212° F. at the glue line, which will cause the necessary changes to develop the desired adhesion. From the point of view of good commercial practice, it is desirable to supply the heat from the rolls through the wood to the glue line. But, the temperatures just mentioned are unsatisfactory because it requires too long a time for the heat to penetrate. We, therefore, apply a temperature of about 350° F. to 450° F. whereby the heat reaches the glue line very rapidly and draws off the moisture from the glue, setting it in a few seconds. The upper limit of applicable temperature range seems to be around 600° F. at the glue line and regardless of the speed with which the pressure is applied and released; for example, in the device of my application above mentioned, there seems to be a carbonizing effect which is not good for the glue. Temperatures have been applied as high as 1000° F. and though the panel was not left in the hot-press long enough to affect the color of the wood, yet the glue line had carbonized and become black, in contra-distinction to the desired white or colorless glue line. The wood stuck together but the glue line was brittle and not commercially satisfactory.

The pressures necessary for proper adhesion seem to be a minimum of about 25 pounds per square inch up to a maximum of around 200 pounds per square inch on very close-grained hardwood of the nature of rock maple. On some woods, such as Douglas fir, pine, spruce, cottonwood, basswood, poplar, the gums and the mahoganies, the necessary range for proper adhesion seems to be from about 25 pounds to 100 pounds per square inch. On hardwoods, such for example as walnut, birch, beech, cherry, oak, maple, nara, tanquille and other woods of like density, a higher pressure of somewhere around 100 pounds to 250 pounds per square inch is required, since the pores, with the exception of the oaks, appear to be so small that when the starch particle or grain is expanded or swelled by the conversion, the plies are forced apart thereby and a satisfactory bond does not result unless these higher pressures be used.

There is no maximum pressure other than that which would crush the wood, although the glue will stick as well even though the wood fibers may be crushed. It is, of course, generally desirable not to crush the wood, although this may be suitable for some purposes. There is a different minimum pressure corresponding to each different kind of wood and, of course, each different kind of wood offers a different resistance to crushing. The relationship of pressure, temperature and duration of application may be summed up by stating that the temperature must be sufficient to convert the starch and insufficient to damage the panel; that the duration increases as the temperature decreases, and that the minimum pressure is required regardless of the temperature, the pressure being generally more important for a satisfactory panel than is the temperature, provided the temperature is within the range just stated. Panels having facing plies ⅛ inch thick require on the average an application of heat and pressure of about 2½ minutes when applying the heat at a temperature of about 350° F., which is the temperature given off by steam at a pressure of about 110 pounds per square inch, while panels with faces of half the thickness, that is, $\frac{1}{16}$ of an inch, can be glued in about forty-five seconds, since the time required for the heat to penetrate to the glue line varies roughly as the square of the thickness of the face to be penetrated by the heat.

Any suitable dry-press apparatus may be used for carrying out this invention, such, for example, as the old-fashioned stationary platen hot-plate press, or as illustrated in the Patent No. 1,706,675, issued March 26, 1929, to George H. Osgood, one of the present applicants; and also in the applications of said Osgood, Serial No. 738,640, filed August 6, 1934, Serial No. 5,728, filed February 9, 1935, and Serial No. 18,577 filed April 27, 1935.

All of our starch-base glues, as above described, have a hydrogen ion concentration corresponding to non-alkalinity or even to a slight degree of acidity. While acid is not introduced as such, the pH of some of our glues is such as to correspond to at least slight acidity. This non-alkaline reaction of our glues is important because all alkaline glues have a tendency to stain the wood and there are very few woods that do not stain when glued with them. All carbohydrate glues and protein glues heretofore made have been alkaline in reaction with the result that care and special treatment, which have interfered with economical, commercial operation, were necessary. Our glues avoid such difficulties and simplify commercial production of veneer panels and other articles comprising glued wood.

While we have referred to various specific formulae, yet it is to be understood that they may be varied and still produce an adhesive which is much stronger when tested in the dry panel after applying heat and pressure to the glued panel than the vegetable-seed-residue glues, and which is comparable to the blood albumen and synthetic resin adhesives after soaking the panel for from forty-eight to ninety-six hours in cold water; while the cost of the glue per thousand feet of three-ply panels is no more than that of the lowest price water-resistant panels glued by any process, be it cold or hot press.

Having described our invention, what we claim is:

1. A composition having glue characteristics for joining wood plies with the application of pressure and heat, comprising water, comminuted unconverted starch, a partially condensed mixture of an aldehyde resistant to dissipation and a substance adapted to be condensed therewith, said aldehyde being in excess of said substance, and being available for reaction on said starch, zinc chloride in an amount equal to about 15% of the weight of said starch, zinc sulphate in an amount equal to about 10% of the weight of said starch, and a colloid in colloidal solution in said water physically to stabilize said composition, said composition having a pH corresponding to non-alkalinity and being non-settling and of a consistency capable of being continuously fed mechanically from a large source thereof to applying rolls, of being spread evenly on said plies by said rolls, and of developing glue characteristics when simultaneously pressed and heated between said plies.

2. A composition having glue characteristics for joining wood plies with the application of pressure and heat, comprising water, comminuted manioc comprising unconverted starch, a partially condensed mixture of an aldehyde resistant to dissipation and a substance adapted to be condensed therewith, said aldehyde being in excess of said substance and being available for reaction on said unconverted starch present, zinc chloride in an amount equal to about 15% of the weight of said starch, zinc sulphate in an amount equal to about 10% of the weight of said starch, and a colloid in colloidal solution in said water physically to stabilize said composition, said composition having a pH corresponding to non-alkalinity and being non-settling and of a consistency capable of being continuously fed mechanically from a large source thereof to applying rolls, of being spread evenly on said plies by said rolls, and of developing glue characteristics when simultaneouly pressed and heated between said plies.

GEORGE H. OSGOOD.
RUSSELL G. PETERSON.